United States Patent
Shirk et al.

(10) Patent No.: US 8,632,727 B2
(45) Date of Patent: Jan. 21, 2014

(54) SELF-SUPPORTING INSULATING END CONE LINER AND POLLUTION CONTROL DEVICE

(75) Inventors: Ryan C. Shirk, Mendota Heights, MN (US); Stephen M. Sanocki, Stillwater, MN (US); Joseph C. Peisert, St. Paul, MN (US); Roger L. Langer, Hudson, WI (US); Loyd R. Hornback, III, Stillwater, MN (US); Ian R. Harding, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/475,041

(22) Filed: May 18, 2012

(65) Prior Publication Data

US 2012/0231187 A1    Sep. 13, 2012

Related U.S. Application Data

(60) Continuation of application No. 12/797,889, filed on Jun. 10, 2010, now Pat. No. 8,182,751, which is a continuation of application No. 10/322,008, filed on Dec. 17, 2002, now Pat. No. 7,758,795, which is a division of application No. 08/853,842, filed on May 9, 1997, now Pat. No. 6,923,942.

(51) Int. Cl.
*B01D 50/00*    (2006.01)

(52) U.S. Cl.
USPC ........................................................ 422/179

(58) Field of Classification Search
USPC ................................................ 422/179, 180
See application file for complete search history.

(56) References Cited

U.S. PATENT DOCUMENTS

| | | |
|---|---|---|
| 2,347,149 A | 4/1944 | Chirgwin |
| 3,058,160 A | 10/1962 | Mocker |
| 3,130,560 A | 4/1964 | Pilcher, III |
| 3,157,204 A | 11/1964 | Phillips |
| 3,203,653 A | 8/1965 | Hall |
| 3,250,833 A | 5/1966 | Wagner |
| 3,289,702 A | 12/1966 | Sherburne |
| 3,336,951 A | 4/1967 | Huelster |
| 3,415,288 A | 12/1968 | Marshak |
| 3,458,329 A | 7/1969 | Owens |
| 3,488,723 A | 1/1970 | Veazie |
| 3,598,157 A | 8/1971 | Farr |

(Continued)

FOREIGN PATENT DOCUMENTS

| | | |
|---|---|---|
| DE | 2300982 | 7/1974 |
| DE | 2314465 | 10/1974 |

(Continued)

OTHER PUBLICATIONS

Howitt et al., "Cellular Ceramic Diesel Particulate Filter," Society of Automotive Engineers, Inc., 1981, pp. 1-9, 810114.

(Continued)

*Primary Examiner* — Tom Duong

(57) ABSTRACT

The invention provides a flexible and self-supporting insulating end cone liner comprising resilient and compressible intumescent or non-intumescent material molded into a single, continuous piece having a three dimensional cone shape, with the insulating material comprising inorganic fibers and an organic binder, and a pollution control device that includes such an end cone liner.

20 Claims, 4 Drawing Sheets

(56) References Cited

U.S. PATENT DOCUMENTS

| | | | |
|---|---|---|---|
| 3,650,868 A | 3/1972 | Murota | |
| 3,655,863 A | 4/1972 | Andersen | |
| 3,673,297 A | 6/1972 | Moore | |
| 3,732,894 A | 5/1973 | Botsolas | |
| 3,801,289 A | 4/1974 | Wiley | |
| 3,891,396 A | 6/1975 | Musall | |
| 3,916,057 A | 10/1975 | Hatch | |
| 3,975,565 A | 8/1976 | Kendall | |
| 3,990,859 A | 11/1976 | Waite | |
| 3,996,145 A | 12/1976 | Hepburn | |
| 4,002,433 A | 1/1977 | Oser | |
| 4,011,651 A | 3/1977 | Bradbury | |
| 4,093,683 A | 6/1978 | Harley | |
| 4,181,514 A | 1/1980 | Lefkowitz | |
| 4,235,950 A | 11/1980 | Miedaner | |
| 4,305,992 A | 12/1981 | Langer | |
| 4,376,675 A | 3/1983 | Perrotta | |
| 4,378,046 A | 3/1983 | Klinger | |
| 4,385,135 A | 5/1983 | Langer | |
| 4,431,449 A | 2/1984 | Dillon | |
| 4,435,468 A * | 3/1984 | TenEyck | 428/212 |
| 4,534,886 A | 8/1985 | Kraus | |
| 4,598,790 A | 7/1986 | Uesugi | |
| 4,693,338 A | 9/1987 | Clerc | |
| 4,865,818 A | 9/1989 | Merry | |
| 4,874,648 A | 10/1989 | Hill | |
| 4,927,608 A | 5/1990 | Wörner | |
| 4,929,429 A | 5/1990 | Merry | |
| 4,950,627 A | 8/1990 | Tokarz | |
| 4,954,462 A | 9/1990 | Wood | |
| 4,999,168 A | 3/1991 | Ten Eyck | |
| 5,008,086 A | 4/1991 | Merry | |
| 5,024,289 A | 6/1991 | Merry | |
| 5,028,397 A | 7/1991 | Merry | |
| 5,078,822 A | 1/1992 | Hodges | |
| 5,151,253 A | 9/1992 | Merry | |
| 5,190,610 A | 3/1993 | Ek | |
| 5,242,871 A | 9/1993 | Hashimoto | |
| 5,250,269 A | 10/1993 | Langer | |
| 5,254,410 A | 10/1993 | Langer | |
| 5,290,522 A | 3/1994 | Rogers | |
| 5,332,609 A | 7/1994 | Corn | |
| 5,338,609 A | 8/1994 | Ondrus | |
| 5,380,580 A | 1/1995 | Rogers | |
| 5,404,716 A | 4/1995 | Wells | |
| 5,408,828 A | 4/1995 | Kreucher | |
| 5,419,127 A | 5/1995 | Moore | |
| 5,437,418 A | 8/1995 | Graef | |
| 5,523,059 A | 6/1996 | Langer | |
| 5,609,934 A | 3/1997 | Fay | |
| 5,660,924 A | 8/1997 | Yamaji | |
| 5,934,337 A | 8/1999 | Fiala | |
| 6,016,846 A | 1/2000 | Knittel | |

FOREIGN PATENT DOCUMENTS

| | | |
|---|---|---|
| DE | 2549255 | 5/1977 |
| DE | 3432283 | 3/1986 |
| DE | 3626728 | 2/1988 |
| DE | 3700070 | 7/1988 |
| DE | 3830352 | 11/1989 |
| DE | 0352246 | 1/1990 |
| DE | 3835841 | 4/1990 |
| DE | 0413998 | 2/1991 |
| DE | 0573834 A1 | 12/1993 |
| EP | 0573834 B1 | 12/1993 |
| EP | 0643204 | 3/1995 |
| EP | 0692616 | 1/1996 |
| FR | 2703105 | 9/1994 |
| GB | 1488649 | 10/1977 |
| GB | 2143902 | 2/1985 |
| GB | 2171180 | 8/1986 |
| JP | 61089916 | 5/1986 |
| JP | 2-061313 | 3/1990 |
| WO | WO 91/19081 | 12/1991 |

OTHER PUBLICATIONS

Smook et al., Handbook for Pulp & Paper Technologists, pp. 218-225 (1982).

Product Literature: The Carborundum Company, FIBERFRAX® Felt Products, 1990, pp. 1-4.

Product Literature: Thermal Ceramics Transportation, Heat Shields for Thermal Management, "Kasoset Moldable Felts", (undated).

ICI Chemicals & Polymers Limited, "Catalytic Converters—Refractory Fibre Retaining Blankets US 4,693,338 Validity", Sep. 27, 1994.

* cited by examiner

SELF-SUPPORTING INSULATING END CONE LINER AND POLLUTION CONTROL DEVICE

CROSS-REFERENCE TO RELATED APPLICATIONS

This application is a continuation of U.S. patent application Ser. No. 12/797,889, filed Jun. 10, 2010 now U.S. Pat. No. 8,182,754, which is a continuation of U.S. patent application Ser. No. 10/322,008, filed Dec. 17, 2002, now U.S. Pat. No. 7,758,795, which is a division of U.S. patent application Ser. No. 08/853,842, filed May 9, 1997 and issued as U.S. Pat. No. 6,923,942.

BACKGROUND OF THE INVENTION

The present invention relates to insulating materials used in pollution control devices and more particularly to a method for making an insulating end cone liner from an intumescent or a non-intumescent material for use in pollution control devices.

Pollution control devices such as catalytic converters and diesel particulate filters or traps are well known, and are most typically used to purify the exhaust gasses produced by internal combustion engines. These types of pollution control devices typically comprise a metal housing with a monolithic element securely mounted within the casing by a resilient and flexible mounting mat.

Two types of devices are currently in wide spread use—catalytic converters and diesel particulate filters or traps. Catalytic converters contain a catalyst, which is typically coated on a monolithic structure mounted in the converter. Monolithic structures are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are wall-flow filters which have honeycombed monolithic structures typically made from porous crystalline ceramic materials. Alternate cells of the honeycombed structure are typically plugged such that exhaust gas enters one cell and is forced through the porous wall of one cell and exits the structure through another cell.

Due to the relatively high temperatures encountered in pollution control devices, it is important that the device be well insulated. Insulation is typically provided by securely mounting the monolithic element within the casing using an insulating mounting mat comprised of a suitable material. In addition, inlet and outlet end cone assemblies which provide a transition from the exhaust pipe to the pollution control device can also be insulated. The inlet and outlet end cone assemblies can be insulated by providing a double-walled end cone assembly comprising an outer metal housing and an inner metal housing, with a gap defined between the inner and outer cone housings. Typical insulating liners are die cut from flat intumescent or non-intumescent sheet materials which then have to be manually wrapped or stuffed between metallic end cone housings. The die cut flat sheet materials may or may not have cuts so to prevent buckling of the material when the flat sheet material is placed between end cone housings.

SUMMARY OF THE INVENTION

Generally, the invention provides an insulating end cone liner for use as an insulating material in an end cone assembly in a pollution control device.

In one aspect, the invention provides an insulating end cone liner comprising resilient and compressible intumescent or non-intumescent insulating material molded into a single, continuous piece having a three dimensional cone shape, with the insulating material comprising inorganic fibers and an organic binder. The insulating end cone liner is dimensioned so as to fill a gap between an inner and outer end cone housing of a pollution control device and said insulating end cone liner exhibits a resiliency value of at least about 35 percent when evaluated using the Resiliency Test Method.

In another aspect, the invention provides a pollution control device comprising an insulating end cone liner according to the present invention; and an inner end cone housing and an outer end cone housing defining a gap therebetween. The insulating end cone liner is disposed within the gap between the inner and outer end cone housings of the pollution control device.

Applicants have discovered methods of forming insulating end cone liners from insulating materials. The resulting insulating end cone liners of the invention are flexible and self supporting and are thus easy to use in the manufacture of pollution control devices.

One of the advantages of the insulating end cone liners of the invention is that the insulating end cone liners of the invention remain relatively flexible, resilient, and compressible and maintain the chemical and performance characteristics of the material used to make the insulating end cone liners.

As used herein, "self supporting" refers to a formed insulating end cone liner which maintains its three dimensional shape under the force of gravity after having been formed.

As used herein, an "insulating end cone liner" means a self-supporting insulating end cone liner made from an intumescent or a non-intumescent sheet material.

As used herein, an "intumescent" material means a material suitable for use in a pollution control device that contains an intumescent material and swells or intumesces when exposed to sufficient thermal energy.

As used herein, a "non-intumescent" material is a material that is suitable for use in a pollution control device that does not contain an intumescent material.

DETAILED DESCRIPTION OF THE INVENTION

Figure 1:
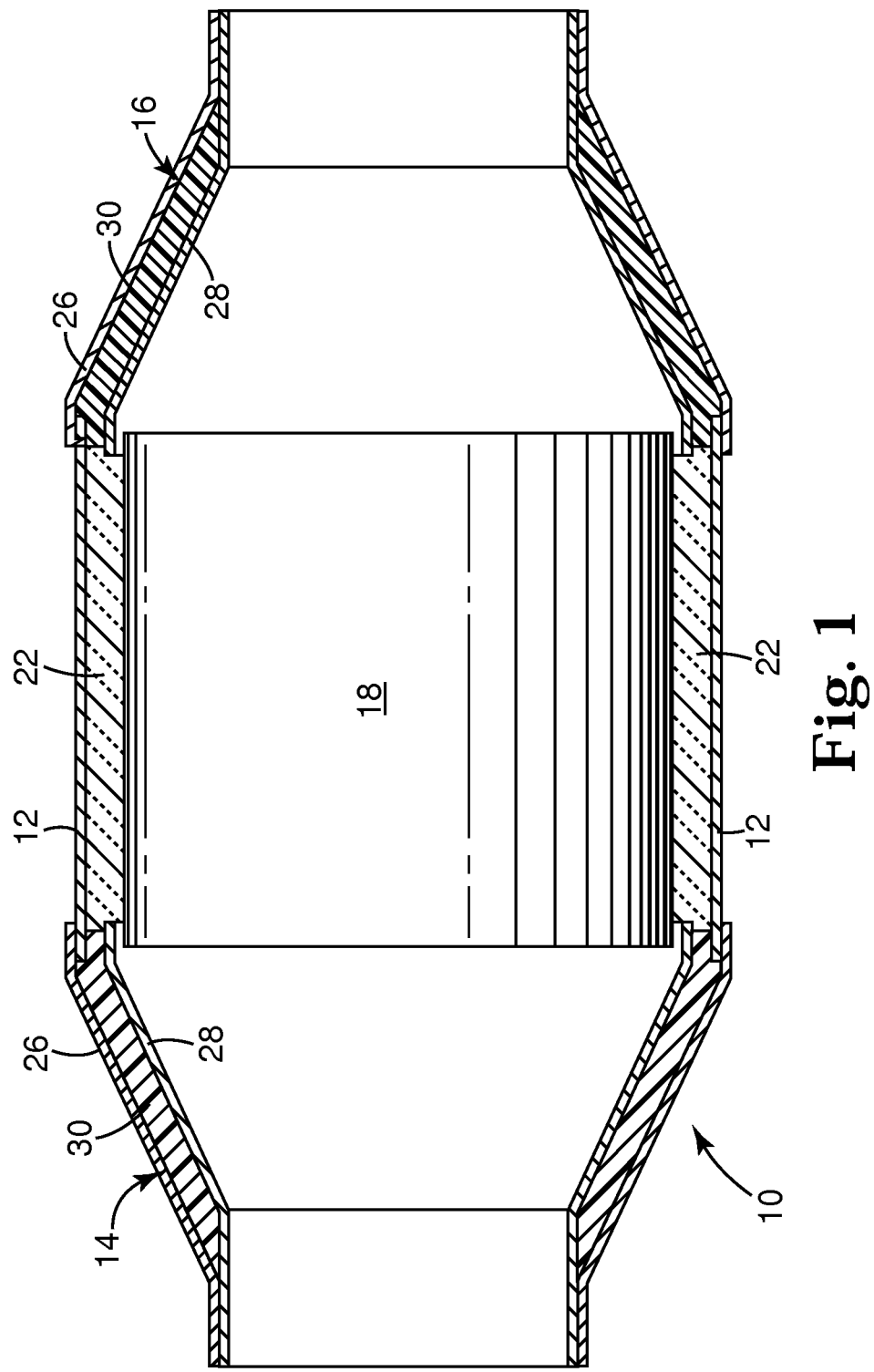
FIG. 1 shows a cross sectional view of a catalytic converter having inner and outer metallic end cone housings with an insulating end cone liner disposed between the end cone housings.

Referring now to the Figures, FIG. 1 shows a pollution control device, and in particular, a catalytic converter 10 which comprises a housing 12 with generally conical inlet end cone assembly 14 and outlet end cone assembly 16. The housing 12, which is also referred to as a can or a casing, can be made from suitable materials known in the art, and is typically made of metal. Preferably, the housing 12 is made of stainless steel. Disposed within housing 12 is a monolithic catalytic element 18 formed of a honeycombed monolithic body either of ceramic or metal. Surrounding monolith 18 is a mounting and insulating mat 22.

Figure 3:
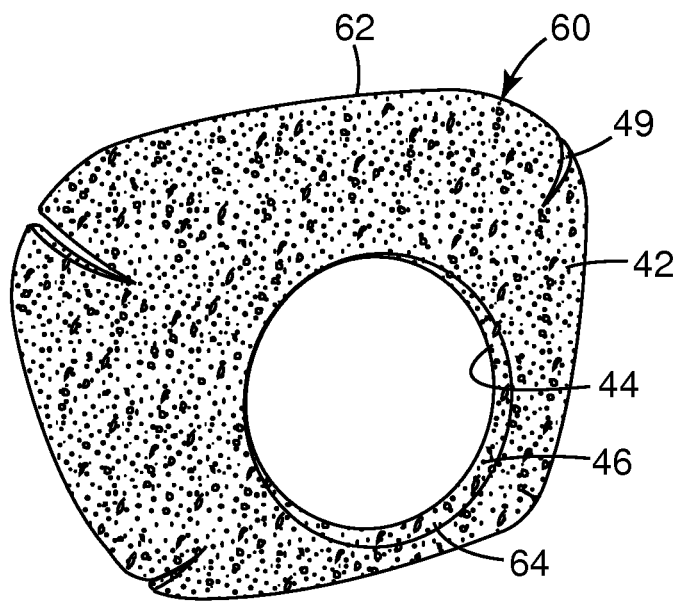
FIG. 3 shows a perspective view of an insulating end cone liner of the invention made from the die cut material shown in FIG. 2.

Referring now to inlet end cone assembly 14 and outlet end cone assembly 16, it can be seen that inlet end cone assembly 14 and outlet end cone assembly 16 each comprise an outer end cone housing 26 and an inner end cone housing 28. An insulating end cone liner 30, shown more particularly in FIG. 3, is positioned between outer end cone housing 28 and inner end cone housing 26. Inner end cone housing 28 is provided in pollution control devices to retain insulating end cone 30 in position and to prevent insulating end cone 30 from being damaged by hot exhaust gases passing through the pollution control device. Inner and outer end cone housings 26, 28 are typically made of metal and are preferably made from stainless steel or an alloy such as INCONEL™ 600.

Figure 2:
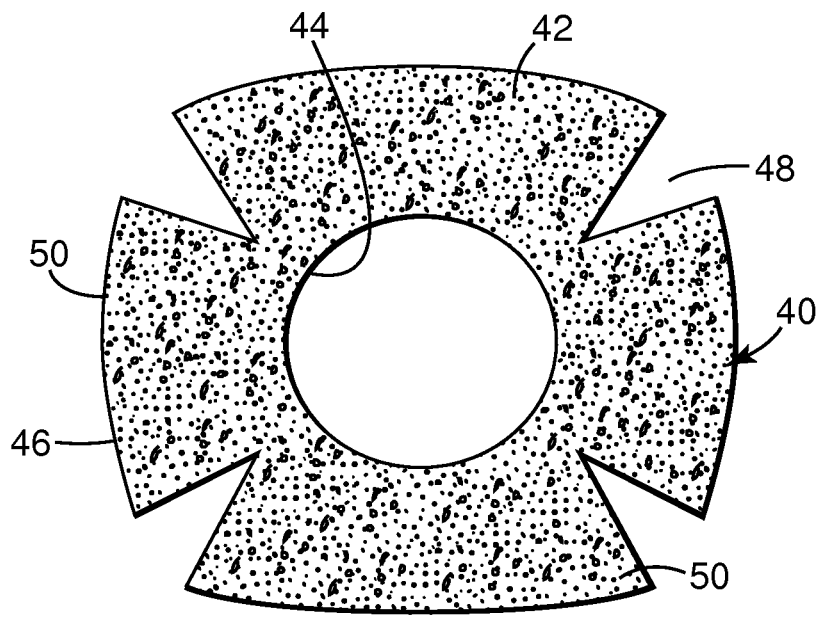
FIG. 2 shows a die cut sheet material prior to being treated.

FIG. 2 shows an embodiment of an insulating material 40 that has been die cut from an intumescent sheet material suitable for use in pollution control devices. Die cut insulating material 40 is one piece and has dimensions and shape such that it can be disposed between inner and outer end cone housings 28, 26. Die cut insulating material 40 is generally in the form of a sheet having major surfaces 42, 44 and a thickness 46. In this embodiment, die cut insulating material 40 has generally "V-shaped" cuts 48 forming tabs 50. The V-shaped cuts 48 relieve the surface tension of the sheet material and allow the die cut material 40 to be formed into a generally conical shaped insulating material without excessive buckling or folding of the insulating material. The shape and size of V-shaped cuts 48 in the die cut material are such that gaps in the insulating material are minimized without undesirable buckling or folding of the material when the die cut material 40 is formed into the final desired shape. Of course, the insulating sheet material may be cut into any useful or desired single piece shape capable of being formed into a cone shape with dimensions suitable for the end use. A useful die cutting machine for intumescent and non-intumescent sheet materials is a Rotomatic™ II die cutter commercially available from Ampak, Inc., Anderson N.C.

One embodiment of an insulating end cone liner of the invention is shown in FIG. 3 as insulating end cone liner 60. Insulating end cone liner 60 is a finished end cone liner made from die cut material 40 shown in FIG. 2. Insulating end cone liner 60 is characterized as being three dimensional, cone shaped and having a front 62 and a back 64 and is self-supporting yet resilient and compressible. When die cut sheet material 40 is formed into liner 60, V-shaped cuts 48 become slits 49. In this embodiment, the sheet material is INTERAM™ Type 200 intumescent mat (3100 g/m²) major surface 44 has been treated and formed using a shape retaining element in the form of a rigidizing solution containing colloidal silica.

Figure 4:
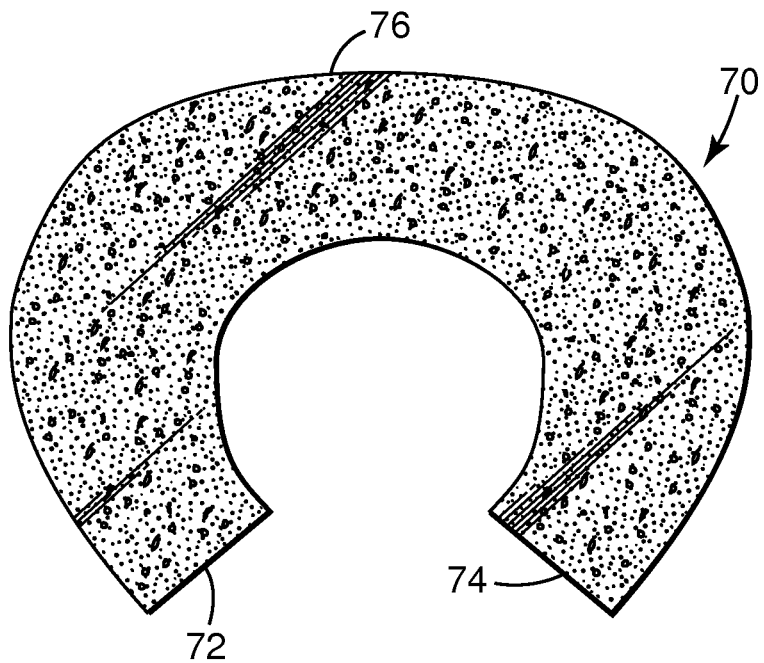
FIG. 4 shows a die cut sheet material prior to being treated.
Figure 5:
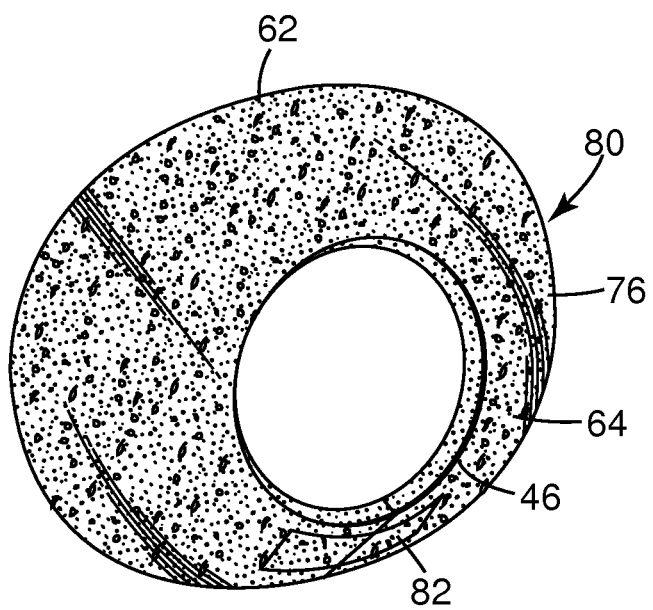
FIG. 5 shows a perspective view of an insulating end cone liner of the invention made from the die cut sheet material shown in FIG. 4.

FIG. 4 shows a die cut sheet material 70 that is used to make a preferred insulating end cone liner 80 shown in FIG. 5. Referring to FIG. 4, die cut sheet material 70 is one piece and generally half-moon shaped and has a first end 72 and second end 74 which are attached together by a shape retaining element in the form of a tape 82 to form insulating end cone liner 80 (FIG. 5). Insulating end cone liner 80 is characterized as being self-supporting in a cone shape and is resilient and compressible. In this preferred embodiment, die cut sheet material 70 is cut from is INTERAM™ Type 100 intumescent mat (3662 g/m²) that has been laminated with a thermoplastic polyester film 76 on one surface before being die cut. Useful thermoplastic films for laminating to the surface of intumescent sheet materials include polyester, polyethylene and polypropylene having a thickness of from about 0.01 mm to about 0.3 mm. A preferred commercially available film is 3M Tape #356, from Minnesota Mining and Manufacturing Company, St. Paul, Minn. Any tape that will adhere sufficiently to substantially inorganic intumescent or non-intumescent sheet materials and/or to thermoplastic films used for lamination to the sheet material can be used as the shape retaining element for this embodiment. Such useful tapes include masking tapes, cloth tapes, surgical tapes, and plastic film tapes such as a polyester film tape, commercially available as 3M Tape #356, from Minnesota Mining and Manufacturing Company. An insulating end cone liner is made by bringing the ends 72, 74 together to form a cone and then attaching the ends together with adhesive tape.

Figure 6:
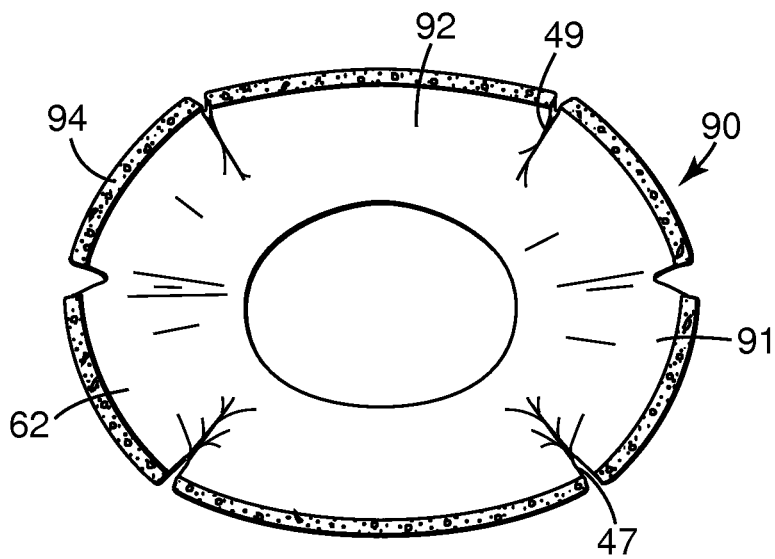
FIG. 6 shows view of another embodiment of the insulating end cone liner of the invention.

Another embodiment of an insulating end cone liner is shown in FIG. 6 as insulating end cone liner 90. End cone liner 90 comprises a cone shaped intumescent sheet material 91 in the shape of a cone having a plurality of slits 49 and a shape retaining element in the form of a metal foil tape 92 laminated to inner or front surface 94.

Figure 7:
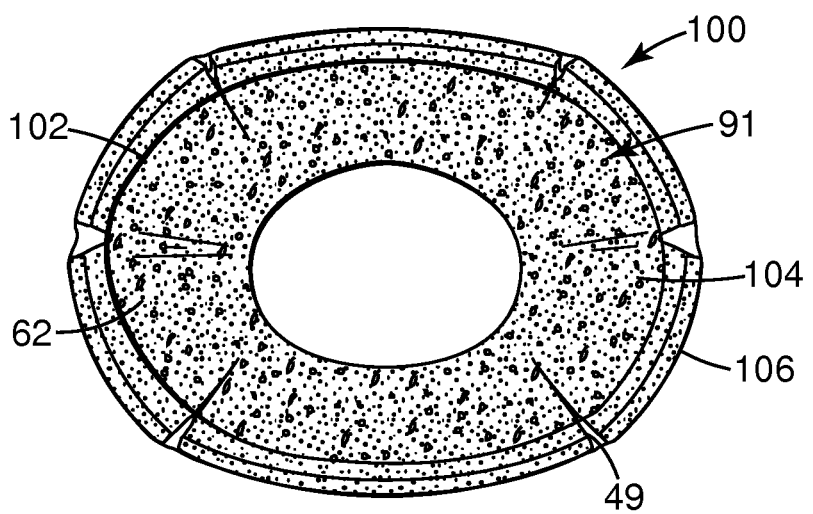
FIG. 7 shows a front view of another embodiment of the insulating end cone liner of the invention.

Another embodiment of an insulating end cone liner of the invention is shown in FIG. 7 as insulating end cone liner 100. End cone liner 100 comprises a cone shaped intumescent sheet material 91 in the shape of a cone having a plurality of slits 49 and a shape retaining element in the form of a heat shrinkable film 102 applied over a top portion of front surface 104 and back surface 106 of the cone shaped sheet material.

The die cut sheet materials used to form the cone shapes can be made from any flexible and resilient insulating sheet material suitable for use in pollution control devices. The material can be intumescent or non-intumescent and is preferably intumescent.

A useful intumescent sheet material for making die cut insulating material 40, 60 comprises a resilient, flexible intumescent sheet comprising from about 20 to 65 percent by dry weight of unexpanded vermiculite flakes, such flakes being either untreated or treated by being ion exchanged with ammonium compound such as ammonium dihydrogen phosphate, ammonium carbonate, ammonium chloride or other suitable ammonium compound as described in U.S. Pat. No. 4,305,992 (Langer et al.); from about 10 percent to 50 percent by dry weight of inorganic fibrous material including aluminosilicate fibers (commercially available under the trademarks FIBERFRAX™ from Unifrax Co., Niagara Falls, N.Y., and CERAFIBER™ from Thermal Ceramics, Augusta, Ga.), glass fibers, zirconia-silica, and crystalline alumina whiskers; from about 3 to 25 percent by dry weight of organic binder including those in latex form for example, natural rubber lattices, styrene-butadiene lattices, butadiene acrylonitrile lattices, lattices of acrylate or methacrylate polymers and copolymers and the like; and up to about 40 percent by dry weight of inorganic filler including expanded vermiculite, hollow glass microspheres and bentonite. A preferred intumescent sheet material comprises about 45 to about 62 dry weight percent unexpanded vermiculite flakes, about 27 to about 45 dry weight percent inorganic fibrous material, and about 3 to about 10 percent organic binder in latex form.

Examples of other useful sheet materials and methods of making the sheet materials include those described in U.S. Pat. No. 5,523,059 (Langer).

Further, examples of intumescent sheet materials and methods of making such sheet materials include those described in U.S. Pat. Nos. 3,916,057 (Hatch et al.), 4,305, 992 (Langer et al.), 4,385,135 (Langer et al.), 5,254,410

(Langer et al.), 4,865,818 (Merry et al.), 5,151,253 (Merry et al.), and 5,290,522 (Rogers et al.). Preferred commercially available intumescent sheets and mats includes those sold under the INTERAM™ tradename by Minnesota Mining and Manufacturing Co. of St. Paul, Minn. The intumescent sheet materials are made using well know papermaking techniques. The mounting mats typically range in thickness from 0.5 to 10 mm.

Other useful intumescent materials include expandable graphite, expandable sodium silicate granules, and partially dehydrated vermiculite as described in U.S. Pat. No. 5,254,410 (Langer et al.).

One example of a shape retaining element is an organic binder. Thermoplastic organic binders include emulsions of organic polymers and elastomers in latex form such as natural rubber lattices, styrene-butadiene lattices, butadiene acrylonitrile lattices, and lattices of acrylate and methacrylate polymers and copolymers. Thermoplastic organic binders also include polymers and polymer resins such as natural rubber, styrene-butadiene rubber, and other elastomeric polymer resins. Acrylic latex and polyvinyl acetate are preferred thermoplastic organic binders. Other useful thermoplastic materials for use as organic binders include polypropylene, polyvinyl alcohol, polyvinyl chloride and polystyrene.

Useful thermosetting materials for use as organic binders include epoxies and phenolics. The organic binder may also include mixtures of two or more thermoplastic and/or thermosetting materials. Useful mixtures include a polymer emulsion combined with a thermoplastic resin or material and a polymer emulsion combined with a thermosetting resin or material.

Examples of preferred commercially available organic binders include RHOPLEX® HA-8 (a 45.5 percent by weight solids aqueous acrylic emulsion) from Rohm & Haas, Philadelphia, Pa. and AIRFLEX® 600BP (a 55 percent solids aqueous polyvinyl acetate emulsion) from Air Products, Allentown Pa.

Inorganic fillers include expanded vermiculite, hollow glass microspheres, and bentonite.

Useful non-intumescent insulating sheet materials for forming the insulating end cone liners of the invention generally comprise inorganic fibers and organic binder. Generally, useful non-intumescent sheet materials comprise from about 60 to about 98 dry weight percent inorganic fiber and from about 2 to about 25 dry weight percent organic binder. A preferred non-intumescent sheet material comprises about 90 percent inorganic fiber and about 10 percent organic binder. The non-intumescent material may also contain inorganic particles or fillers and one or more inorganic binders. The non-intumescent insulating material is preferably in the form of a sheet having a thickness of from about 0.5 to about 15 mm.

Essentially shot-free ceramic fibers useful in forming non-intumescent insulating sheet materials include alumina-boria-silica fibers, alumina-silica fibers, alumina-phosphorus pentoxide fibers, zirconia-silica fibers, zirconia-alumina fibers, and alumina fibers. "Essentially shot free" or "shot free" fibers are fibers that contain less than 5 percent by weight and preferably less than 1 percent by weight of shot or non-fibrous particulate material and fibers which are at least 95 percent shot-free and preferably 99 percent shot-free. Useful commercially available fibers include those under the trademarks FIBERMAX™, available from Unifrax, SAFFIL™ LD, available from ICI Chemicals & Polymers, ALCEN™ alumina fibers available from Denka, and MAFTECH fibers, available from Mitsubishi.

The fibers are typically formed by blowing or spinning using methods known in the industry. Preferable, the fibers are formed by spinning a sol gel solution. The fibers are formed into a mat or sheet by various known methods including blowing the fibrous material onto a collection screen as is practiced in the nonwoven industry. A preferred non-intumescent inorganic fiber is a polycrystalline alumina fiber, available under the trademark SAFFIL™ from ICI Chemicals and Polymers. The fiber is chemically resistant and may be used in selected applications up to 1600° C. It is produced in a low density sheet form which consists of a predominately two-dimensional random orientation of fiber resulting in a mat of lamella form. The sheet is essentially shot-free with a uniform fiber structure.

The lamella nature of the low density mat makes it necessary to introduce the means for preventing delamination during handling and assembly in the pollution control device. That is, the low density sheet of alumina fiber is preferably physically restrained or compressed during handling and assembly. When compressed to a mount density of about 0.05 and 0.60 grams per cubic centimeter these materials have a unique ability to repeatedly undergo a reduction in thickness while hot and spring back to substantially their original thickness when cooled, thus maintaining their structural integrity.

Since the fiber material preferred for the non-intumescent insulating end cone liners 60 are generally available in the density range of 0.05 to 0.30 grams per cubic centimeter, they must be compressed by about a factor of 1 to 10 when used as insulating materials within the end cone housings 28, 26. Sheets of the non-intumescent insulating material are generally compressed and held in the compressed state to facilitate handling and cutting of the material. The non-intumescent insulating sheet material may be physically compressed in a variety of manners, including the use of resin bonding, or needle punching.

Resin bonding is accomplished by saturating the non-intumescent material with organic binders which burn off in the presence of heat generated from hot exhaust gas. The organic materials burn off when exposed to heat generated from hot exhaust gas.

Preferred commercially available non-intumescent sheet materials are SAFFIL™ LD alumina fiber sheet (from ICI Chemicals and Polymers, Cheshire, England) and FIBERFRAX™ 550K fiber sheet (from Unifrax, Niagara Falls, N.Y.).

Organic binders and organic fibers that are useful in non-intumescent sheet materials include those described above for intumescent sheet materials.

The intumescent and non-intumescent sheet materials that are useful for the present invention are made by well known wet laid methods including methods used to make paper.

One method of making the finished end cone liners of the invention from a flexible and resilient intumescent or non-intumescent sheet material includes the step of treating at least one of the major surfaces of the intumescent or non-intumescent sheet material. The surface treatment is applied to at least one surface of the sheet material to add enough rigidity to the material so that after the material is formed into the shape of an end cone liner, the end cone liner will be self-supporting but not be so rigid so to be prone to cracking or breaking during handling for its intended use.

Useful surface treatments include applying a shape retaining element in the form of a rigidizing solution to at least one surface of the sheet material. A ridigizing solution is a solution that when applied to the surface of a sheet material and then dried, stiffens or makes rigid the surface to which the solution was applied. The solutions may be applied to the surfaces of the intumescent or non-intumescent sheet material by means of a brush or a sprayer. Useful rigidizing solutions include saturated solutions of colloidal silica, colloidal alumina, silicon carbide, magnesium phosphate, vermiculite emulsions, clay emulsions, and monoaluminum phosphate.

Useful commercially available rigidizing solutions include a magnesium phosphate suspension (100% solids, from ZYP Coatings, Inc., Oak Ridge, Tenn.), Nalco 2327 colloidal silica (50% solids, from Nalco Chemical Company, Naperville, Ill.), and a 50% solids solution of monoaluminum phosphate (Technical Grade, from Rhone-Poulenc Basic Chemical Co., France). Preferred rigidizing solutions are solutions of colloidal alumina and colloidal silica. Preferably, only one of the surfaces of the sheet material is treated with a rigidizing solution. In use, the treated surfaces of the insulating end cone liners of the invention are adjacent to the outer surface of the inner end cone housing.

Generally, the amount of a rigidizing solution applied to the surface of the intumescent or non-intumescent sheet material can vary depending upon the desired characteristics of the end product. However, the treatment should be in a sufficient amount so as to provide a self supporting article. The treatment should also not be in such an amount so as to result in a finished part that is brittle and easily broken during handling for its intended purpose. Typically, the amount of solids from a rigidizing solution (dry weight percent) added to a surface of a die cut sheet material is equal to about 10 percent of the dry weight of the die cut part.

Once the sheet material is treated with a rigidizing solution, the sheet material is formed into the desired shape by preferably, placing the treated sheet material in between inner and outer metal end cone housings, clamping the housings together, placing the assembly into an oven to dry the sheet material, to form the insulating end cone liner, removing the assembly from the oven, allowing the assembly to cool to room temperature and then removing the insulating end cone liner from the metal housings. Of course, the treated sheet materials may also be formed using any suitable mold having the shape of the desired finished article.

Another method of treating at least one of the surfaces of the sheet material used to make the insulating end cone liners of the invention is to apply a shape retaining element in the form of thin layer of metal foil the surface of a sheet material. The metal foil layer can be any metal that can be formed into a three dimensional article for use in a pollution control device. The metal layer may be applied to the surface of the sheet material by means of an adhesive. The metal layer preferably has a thickness of from about 0.0030 inches (0.076 mm) to about 0.0100 inches (0.254 mm) A preferred metal is aluminum and the layer of aluminum is preferably applied to the surface of the sheet material by means of a aluminum tape such as T-49 Foil Tape (from Minnesota Mining and Manufacturing Company, St. Paul, Minn.) In use, the metal layer is preferably placed over one or both of the surfaces of the sheet material prior to cutting the material to the desired shape and dimension.

Another method of treating at least one surface of a sheet material used to make insulating end cone liners of the invention is to apply a shape retaining element in the form of a heat shrinkable film layer to the surface of the sheet material. A heat shrinkable film may be applied over one or both of the entire surfaces of the sheet material and is preferably applied over a portion of the surfaces of the sheet material. Examples of useful heat shrinkable films include polyolefins including polyesters such as SCOTCHPAK™ Type 115 polyester film tape (from Minnesota Mining and Manufacturing Company, St. Paul, Minn.).

In use, the heat shrinkable film is applied one or both surfaces of a sheet material using an adhesive or tape or other attachment means and the sheet material is die cut to the desired shape and dimensions. The cut and film covered sheet material is positioned around the outer surface of the inner metal end cone housing and heat is applied to the film until the film shrinks to form a self-supporting end cone. The required thermal energy or heat may be applied by means of a heat gun or a convection oven and the like and is preferably applied by means of a heat gun. Alternatively, the die cut sheet material is cut to the desired shape and dimensions, is positioned onto the inner metal end cone housing, and a strip or band of heat shrinkable film is wrapped around the edge of the sheet material having the largest circumference, that is, the top or tabbed portion of the end cone and then sufficient heat is applied to shrink the film to form a self-supporting insulating end cone liner. A preferred heat shrinkable film material is polyester and the heat shrinkable film is preferably applied over the top or tabbed portion of the cut sheet material.

Another method of making insulating end cone liners of the invention comprises the steps of providing intumescent or non-intumescent materials that contain a shape retaining element in the form of an organic binder comprising a thermoplastic and/or a thermosetting polymer material, said sheet material cut into the desired shape, forming the cut sheet material into the desired finished three dimensional shape, and then heating the formed intumescent or non-intumescent sheet to a sufficient temperature and for a sufficient time so to melt or partially melt and/or cure the polymeric organic binder and cause it to fuse to form a three dimensional and self-supporting insulating end cone liners. In the case of a thermoplastic polymer material, the finished insulating end cone liner is formed after the formed sheet material is cooled. The cut sheet material can be formed by placing the sheet material into a mold having the desired shape and dimensions and then heating the mold containing the cut sheet material as described above.

The amount of the thermoplastic and/or thermosetting polymer material contained within the intumescent or non-intumescent sheet material should be sufficient to form a self-supporting article from a sheet material. The thermoplastic and/or thermosetting resin contained within the sheet material should not be present in an amount to provide an insulating end cone liner that would be subject to undesirable cracking or breaking during handling for its intended purpose.

Another method of making insulating end cone liners of the invention comprises the steps of providing an intumescent or a non-intumescent sheet material containing a shape retaining element in the form of an organic binder that comprises an aqueous polymer emulsion, for example, a polymer or elastomer in latex form, the sheet material being cut into the desired shape and dimensions, placing the cut sheet material into a mold having the dimensions to make the desired finished article, saturating the molded sheet material with water, and then heating the sheet material contained within the mold until the water has evaporated to form a finished insulating end cone liner. Alternatively, the molded sheet material can be saturated by means of applying steam to the sheet material within the mold, and then allowing the sheet material within the mold to dry at room temperature to form the finished insulating end cone liner. Typical water content of the treated intumescent or non-intumescent sheet material during the forming step ranges from about 5 to about 55 percent by weight of the sheet material.

The intumescent or non-intumescent sheet materials used to form the articles of the invention may also contain one or more organic fibers as shape retaining elements in addition to the organic binders described above.

In use, the insulating end cone liners of the invention are placed within the inner and outer end cone housings and the housings are welded together to form a conical inlet or outlet for a pollution control device. The conical inlet or outlet is then welded to the metal housing of the pollution control device. The insulating end cones are useful for suppressing noise and vibration in a pollution control device and also for providing thermal insulation from exhaust heat.

EXAMPLES

Test Methods
Hardness Test
The hardness of the treated surfaces of the finished insulating end cone liners was determined using a Shore Durometer™ Hardness Tester Type A instrument.
Resiliency Test Method
This test is used to measure the amount of resiliency of an insulating end cone liner as a function of retained height of the insulating end cone liner after a mass is applied.

An insulating end cone liner is placed on a level surface with the large diameter opening down (inverted cone). A sheet of rigid cardboard is placed onto the opposite surface. A 20 gram weight is placed on the cardboard and centered over the end cone and the height of the cardboard sheet is recorded as the "Initial Height." The 20 g weight is removed and 200 g and 50 g weights are placed onto the cardboard as above and the height of the cardboard sheet is recorded as "Final Height." Resiliency is calculated by using the following formula: Resiliency=(final height/initial height)×100%. Each of the samples tested should have substantially the same dimensions.

Generally, the insulating end cone liners of the invention have a resiliency value of from about 35 to about 97 percent, preferably from about 50 to about 97 percent, and more preferably, about 75 to about 97 percent.
Test Method to Determine Thickness and Density Variation
This method is used to determine the variation in thickness and density of formed articles. At least 12 die cut pieces must be removed from each sample. The die cut pieces are taken from the edges and middle portions of each sample. The die is a circular die having a diameter of 11 mm. A pressure of about 13.6 psi (93.6 kPa) is exerted on each die cut piece of each example and then each sample is measured for thickness to the nearest 0.003 cm. These measurements can be performed using a dial gauge available from Federal, Providence, R.I. Each die cut piece is weighed to the nearest 0.01 g and the weights recorded in grams. Weight per unit area (g/m$^2$) is calculated by using the following formula: Weight per unit area=(weight (g))/((121 mm$^2$×pi)/4,000,000). The thickness and weight per unit area values are averaged and 3 standard deviations are calculated.

Generally, the insulating end cone liners of the invention have thickness variability (3 standard deviations) of less than 50 percent, preferably less than 30 percent, and more preferably less than 20 percent.

Example 1

A sheet of intumescent sheet material (INTERAM™ Type 200 mat (3100 g/m$^2$ available form Minnesota Mining and Manufacturing Company, St. Paul, Minn.) was die cut using a die cutter (Rotomatic™ II, from Ampak, Inc., Anderson, S.C.) to form a die cut part similar to that shown in FIG. 2 such that it would conform to the geometry of an outer metal cone housing. The die cut part had general dimensions of 144 mm by 155 mm and weighed about 48.4 g. The part was treated on the entire surface of one side with a colloidal silica solution (Nalco™ 2327, from Nalco Chemical Company, Naperville, Ill.) with a paint brush. The coated part was placed into an outer metal cone housing similar to that shown in FIG. 1 (female portion) with the coated surface up. The coated part was pressed into the shape of the outer cone housing with an inner cone housing (male portion). The inner cone housing was removed, the formed part inside the outer cone housing was placed into a forced air laboratory oven (Blue M OV-560A-2, from Blue M Electric Company, Blue Island, Ill.) and dried for about 1 hour at a temperature of 110° C. After drying, the formed insulating end cone liner was removed from the outer cone housing, allowed to cool, and was weighed. The finished insulating end cone liner had a weight of 52.7 g.

The dried insulating end cone liner material was self supporting and kept its formed shape during handling. The uncoated surface of the insulating end cone liner was soft and compressible and had a measured hardness value of about 25 when measured using the Durometer™ Hardness Tester and method described above. The coated surface of the insulating end cone liner had a measured hardness of about 40. When placing the insulating end cone liner into the outer and inner metal cone housings, the insulating end cone liner remained flexible and conformable and could easily be placed into the housings.

Example 2

The procedure used in Example 1 was repeated to form a finished insulating end cone liner except that the die cut part was saturated with colloidal silica by immersing the part into a container containing a colloidal silica solution. After drying, the coated insulating end cone liner had a weight of 77 g. The finished insulating end cone liner was self supporting and felt very rigid. The measured hardness value of both surfaces ranged from 70 to 80. When fitting the insulating end cone liner inside of the inner and outer housings, one of the tab portions of the part cracked.

Examples 3-4

A sheet of intumescent mat material (INTERAM™ Type 100, 3662 g/m$^2$, from Minnesota Mining and Manufacturing Company) and a sheet of non-intumescent mat material (FIBERFRAX™ 550K fiber sheet, from Unifrax, Niagara Falls, N.Y.) were die cut as described in Example 1 to form die cut Examples 3 and 4. The composition of the intumescent sheet material was about (dry weight percent) 42.5 to about 62.5 percent unexpanded vermiculite, 27 to 45 percent inorganic fiber, 3 to 10 percent latex organic binder. The composition of the non-intumescent sheet material was about 90 percent inorganic fiber and 10 percent latex organic binder. The samples were moistened in tap water by immersion under running tap water and then each of the saturated die cut materials were placed in between similar outer and inner end cone housings to those described in Example 1 above. The inner and outer end cone housings were clamped together and then placed in an oven at a temperature of 100° C. for about 60 minutes until the water had evaporated. The clamped end cone housings containing the die cut materials were removed from the oven, allowed to cool to room temperature, and the formed intumescent and non-intumescent insulating end cone liners were removed. Both of the intumescent and non-intumescent insulating end cone liner materials were flexible and self supporting and compressible and could be handled without cracking or breaking.

Examples 5-6

Aluminum foil tape, 4 mm thick, (T-49 foil tape, from Minnesota Mining and Manufacturing Company, St. Paul, Minn.) was laminated to a sample of intumescent sheet material (INTERAM™ Type 100, 3662 g/m$^2$, from Minnesota Mining and Manufacturing Company) having dimensions of about 35 cm by 35 cm such that an entire surface of the intumescent sheet material was covered. The foil covered sheet material was then die cut as in Example 3. The foil coated die cut part was then formed over the outside surface of an inner metal cone housing with the foil side adjacent to the outside surface of the inner end cone housing. The outside end cone casing was then placed over the outside of the insulating material and positioned properly into a finished end cone. The outer end cone housing was removed, and the formed insulating end cone liner was removed. The formed foil coated insulating end cone liner of Example 5 was flexible and self supporting.

The procedure of Example 5 was repeated except that both sides of the intumescent sheet material were covered with the foil tape to form the insulating end cone liner of Example 6. The insulating end cone liner of Example 6 was flexible and self supporting.

Example 7

An intumescent sheet material was die cut as described in Example 3. The die cut material was then formed over the inner end cone housing of Example 3 and a heat shrinkable polyester film, SCOTCHPAK™ Type 115 tape, was wrapped around the top or open edge of the die cut intumescent material such that it extended about 20 mm past the lip or edge of the die cut material. The heat shrinkable film was about 33 mm wide and about 300 mm in length. Heat was applied to the film by means of a 1440 watt heat gun for about 30 seconds until the wrap shrunk around the die cut material. The formed insulating end cone liner was removed from the inner end cone housing and was flexible and self supporting. An advantage of this method of forming an insulating end cone liner is that a relatively small amount of the shrink-wrap film is required to form the insulating end cone liner of the invention.

Example 8

A die cut intumescent sheet material as described in Example 3 was coated on one side with the rigidizing solution described below. The rigidizing solution was applied to the die cut material using a small paintbrush until the entire surface of the material appeared wet. The rigidizing solution was a 5:1 magnesium phosphate cement in deionized water (ZYP™ RS-1000 cement, from ZYP Coatings Inc., Oak Ridge, Tenn.). The coated sample was placed between inner and outer end cone housings as described in Example 3. The clamped end cone housing containing the coated sample was placed in a 100 C oven for about 60 minutes until the coating dried to form the insulating end cone liner. The resulting insulating end cone liner was flexible and self supporting and could be handled without undesirable cracking or breaking.

Example 9

A sheet of intumescent sheet material (INTERAM™ Type 100, 3662 g/m$^2$, from Minnesota Mining and Manufacturing Company) was laminated on one surface with a polyester film tape (3M Tape #356) and then die cut into the shape as shown in FIG. 4. The ends were brought together such that the cut sheet material was in the shape of a cone and then the ends were taped together with a piece of the polyester film tape to form the finished insulating end cone liner shown in FIG. 5.

Examples 1, 2, 3, 5, 7, 9 and Examples 10, 11

Examples 1, 2, 3, 5, 7, 9, and Examples 10, 11 described below, were tested for resiliency using the Resiliency Test Method described above.

Example 10 was a slush molded insulating end cone liner that was made using a mold having the same shape as the mold used in Example 1. The composition of Example 10 was about 7.35 dry weight percent of starch binder and about 92.65 dry weight percent of refractory ceramic fiber.

Example 11 was a slush molded insulating end cone liner made as described in Example 10 above having a composition of about 14 dry weight percent starch binder and 86 percent by weight shredded intumescent sheet material (INTERAM™ X-D mounting material, from Minnesota Mining and Manufacturing), the shredded intumescent sheet material having a dry weight composition of about 45-62.5% unexpanded vermiculite, 27.5-45% ceramic fiber, and 3-10% organic binder. The slush molded insulating end cone liners were made by making dilute aqueous slurries, placing a permeable mold into each of the slurries and removing the water using gravity and/or vacuum and then drying the formed end cone liners on the mold. Results are shown in Table 1 below.

TABLE 1

| Example | Resiliency (%) |
|---|---|
| 1 | 97 |
| 3 | 79 |
| 5 | 49 |
| 7 | 97 |
| 9 | 94 |
| 2 | 99 |
| 10 | 100 |
| 11 | 100 |

Examples 3, 10 and 11

The intumescent sheet material used to make the insulating end cone liner of Examples 3, 10 and 11 were tested for thickness and density variability using the method described above. The results are shown in Table 2 below.

TABLE 2

| | Example 10 | Example 11 | Example 3 |
|---|---|---|---|
| N = 12 | | | |
| Average Thickness (in.) | 0.26 | .338 | 0.206 |
| 3 Std. Dev. | 0.05 | .217 | 0.02 |
| + or −3 Std. Dev. | 21% | 64% | 8% |
| Average Weight (g) | 0.21 | 0.42 | 0.33 |
| 3 Std. Dev. | 0.02 | 0.33 | 0.06 |
| + or −3 Std. Dev. | 9% | 79% | 17% |
| Average Weight Per Area (g/M$^2$) | 2211 | 4404 | 3501 |
| 3 Std. Dev. | 190 | 3478 | 589 |
| + or −3 Std. Dev. | 9% | 79% | 17% |

What is claimed is:

1. A flexible and self-supporting insulating end cone liner comprising resilient and compressible insulating material molded into a single, continuous piece having a three dimensional cone shape, with the insulating material being a non-intumescent material comprising inorganic fibers and a binder,
   wherein said insulating end cone liner is dimensioned so as to fill a gap between an inner and outer end cone housing of a pollution control device, and said insulating end cone liner exhibits a resiliency value of at least about 35 percent when evaluated using the Resiliency Test Method.

2. The insulating end cone liner according to claim 1, wherein said insulating end cone liner exhibits a resiliency value in the range of from about 35 percent up to about 97 percent when evaluated using the Resiliency Test Method.

3. The insulating end cone liner according to claim 1, wherein said insulating material is compressible by a factor of 1 to 10.

4. The insulating end cone liner according to claim 3, wherein said insulating material has a density in the range of 0.05 to 0.30 grams per cubic centimeter and is able to repeatedly undergo a reduction in thickness while hot and spring back to substantially its original thickness when cooled.

5. The insulating end cone liner according to claim 1, wherein said insulating material further comprises inorganic filler.

6. The insulating end cone liner according to claim 1, wherein said insulating material comprises from about 60 to about 98 dry weight percent inorganic fibers and from about 2 to about 25 dry weight percent organic binder.

7. The insulating end cone liner according to claim 1, wherein said insulating end cone liner is a slush molded insulating end cone liner.

8. The insulating end cone liner according to claim 1, wherein said insulating material further comprises one or more inorganic binders.

9. The insulating end cone liner according to claim 1, wherein said insulating end cone liner has a wall thickness of from about 0.5 mm to about 15 mm.

10. The insulating end cone liner according to claim 1, wherein said insulating material contains less than 5 percent by weight of shot or non-fibrous particulate material.

11. The insulating end cone liner according to claim 1, wherein said insulating material contains less than 1 percent by weight of shot or non-fibrous particulate material.

12. The insulating end cone liner according to claim 1, wherein the inorganic fibers comprise at least one of polycrystalline alumina fiber and refractory ceramic fiber.

13. The insulating end cone liner according to claim 1, wherein the binder is an organic binder selected from the group consisting of emulsions of organic polymers, elastomers in latex form, natural rubber lattices, styrene-butadiene lattices, butadiene acrylonitrile lattices, lattices of acrylate, methacrylate polymers and copolymers, thermoplastic polymers and polymer resins, natural rubber, styrene-butadiene rubber, other elastomeric polymer resins, acrylic latex and polyvinyl acetate.

14. The insulating end cone liner according to claim 1, wherein said insulating end cone liner consists essentially of resilient and compressible non-intumescent insulating material.

15. A pollution control device, said pollution control device comprising:
   an insulating end cone liner according to claim 1; and
   an inner end cone housing and an outer end cone housing defining a gap therebetween,
   wherein said insulating end cone liner is disposed within the gap between the inner and outer end cone housings of the pollution control device.

16. The pollution control device according to claim 15, wherein said insulating end cone liner exhibits a resiliency value in the range of from about 35 percent up to about 97 percent when evaluated using the Resiliency Test Method.

17. The pollution control device according to claim 15, wherein said insulating material comprises from about 60 to about 98 dry weight percent inorganic fibers and from about 2 to about 25 dry weight percent organic binder.

18. The pollution control device according to claim 15, wherein said insulating material is a non-intumescent insulating material that is compressed by a factor of 1 to 10.

19. The pollution control device according to claim 18, wherein said non-intumescent insulating material is physically compressed by resin bonding.

20. The pollution control device according to claim 15, wherein said insulating end cone liner is compressed to a mount density of about 0.05 and 0.60 grams per cubic centimeter such that said insulating material is able to repeatedly undergo a reduction in thickness while hot and spring back to substantially its original thickness when cooled.

* * * * *

UNITED STATES PATENT AND TRADEMARK OFFICE
CERTIFICATE OF CORRECTION

| | | |
|---|---|---|
| PATENT NO. | : 8,632,727 B2 | Page 1 of 1 |
| APPLICATION NO. | : 13/475041 | |
| DATED | : January 21, 2014 | |
| INVENTOR(S) | : Ryan Shirk | |

It is certified that error appears in the above-identified patent and that said Letters Patent is hereby corrected as shown below:

In the Specification

Col. 1, line 10, Delete "8,182,754," and insert -- 8,182,751, --

Col. 7, line 49, Delete "mm) A" and insert -- mm). A --

Signed and Sealed this
Second Day of September, 2014

Michelle K. Lee
*Deputy Director of the United States Patent and Trademark Office*